US012355128B2

(12) United States Patent
Kwak

(10) Patent No.: US 12,355,128 B2
(45) Date of Patent: Jul. 8, 2025

(54) METHOD AND APPARATUS FOR TUNING GOLDEN FILTER

(71) Applicant: Electronics and Telecommunications Research Institute, Daejeon (KR)

(72) Inventor: Chang Soo Kwak, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 756 days.

(21) Appl. No.: 17/549,107

(22) Filed: Dec. 13, 2021

(65) Prior Publication Data

US 2022/0190454 A1 Jun. 16, 2022

(30) Foreign Application Priority Data

Dec. 14, 2020 (KR) ........................ 10-2020-0174404

(51) Int. Cl.
*H01P 1/20* (2006.01)
*H01P 1/207* (2006.01)

(52) U.S. Cl.
CPC ............ *H01P 1/2002* (2013.01); *H01P 1/207* (2013.01)

(58) Field of Classification Search
CPC ...... H01P 1/2002; H01P 1/207; H01P 11/007; H01P 5/04; H03J 1/06
See application file for complete search history.

(56) References Cited

U.S. PATENT DOCUMENTS

| | | | | |
|---|---|---|---|---|
| 6,337,611 | B1 | 1/2002 | Hult | |
| 10,873,118 | B2 * | 12/2020 | Wang | H01P 1/207 |
| 2015/0035623 | A1 * | 2/2015 | Kwak | H01P 1/205 333/203 |
| 2015/0116058 | A1 | 4/2015 | Lee et al. | |
| 2017/0288289 | A1 * | 10/2017 | Zhao | H01P 1/207 |

FOREIGN PATENT DOCUMENTS

| | | |
|---|---|---|
| KR | 20-0302695 | 1/2003 |
| KR | 10-2010-0102378 | 9/2010 |
| KR | 10-2010-0102379 | 9/2010 |
| KR | 10-2013-0011044 | 1/2013 |
| KR | 101864616 B1 * | 6/2018 |
| KR | 10-2081950 | 2/2020 |

* cited by examiner

*Primary Examiner* — Andrea Lindgren Baltzell
*Assistant Examiner* — Kimberly E Glenn
(74) *Attorney, Agent, or Firm* — KILE PARK REED & HOUTTEMAN PLLC

(57) ABSTRACT

A method of tuning a golden filter used to initially tune a microwave filter using an apparatus for tuning the golden filter may comprise: fixing the golden filter with a plurality of filter fixing bolts and nuts; bringing a plurality of height adjusting screws into contact with tuning screws of the fixed golden filter; fixing the plurality of height adjusting screws with height adjusting screw nuts; and removing the plurality of filter fixing bolts and nuts and moving the golden filter.

16 Claims, 10 Drawing Sheets

METHOD AND APPARATUS FOR TUNING GOLDEN FILTER

CROSS-REFERENCE TO RELATED APPLICATIONS

This application claims priority to Korean Patent Application No. 10-2020-0174404, filed on Dec. 14, 2020, filed with the Korean Intellectual Property Office (KIPO), the entire contents of which are hereby incorporated by reference.

BACKGROUND

1. Technical Field

The present disclosure relates to a method and apparatus for tuning a golden filter, and more particularly, to a method of tuning a golden filter, which is used to initially tune a microwave filter using an apparatus for tuning the golden filter.

2. Related Art

Because a microwave filter is incompletely designed and manufactured, the microwave filter needs to be tuned by adjusting tuning elements after assembling respective components to implement desired performance. Tuning screws are used as the tuning elements in the related art, and tuning nuts need to be used to fix the tuning screws.

The desired performance of the filter is not implemented before the tuning screws are adjusted. However, the desired performance of the filter may be implemented by appropriately adjusting the tuning screws. Because this process can be performed only by an expert, a large amount of personnel cost is required to manufacture the filter.

To manufacture a plurality of filters having the same characteristics, the tuning screws are somewhat similarly inserted with reference to the previously tuned filter (golden filter), and then the initial tuning is initiated to reduce the tuning time. A process in which the expert finely performs the tuning after the initial tuning is referred to as final tuning.

However, even though the expert finely performs the tuning, the tuning cannot be performed as accurately as the tuning apparatus can, and a large amount of time is required when the expert directly performs the tuning.

SUMMARY

The present disclosure has been made in an effort to provide a method of tuning a golden filter, which is used to initially tune a microwave filter using an apparatus for tuning the golden filter.

The present disclosure has also been made in an effort to tune a microwave filter using a golden filter, thereby reducing the time required for the tuning.

According to an exemplary embodiment of the present disclosure for achieving the above-described objective, a method of tuning a golden filter used to initially tune a microwave filter using an apparatus for tuning the golden filter may comprise: fixing the golden filter with a plurality of filter fixing bolts and nuts; bringing a plurality of height adjusting screws into contact with tuning screws of the fixed golden filter; fixing the plurality of height adjusting screws with height adjusting screw nuts; and removing the plurality of filter fixing bolts and nuts and moving the golden filter.

The bringing of the plurality of height adjusting screws into contact with the tuning screws of the fixed golden filter may comprise rotating the plurality of height adjusting screws clockwise or counterclockwise with torque preset by a user.

The height adjusting screw may be provided in the form of a self-locking screw.

A driver slot may be formed in an edge portion of the height adjusting screw, and a hole may be formed at a center of the height adjusting screw.

The number of height adjusting screws may be at least equal to the number of tuning screws of the golden filter.

The method may further comprise: fixing the golden filter with a flat spring or a coil spring instead of the filter fixing bolt and nut.

According to another exemplary embodiment of the present disclosure for achieving the above-described objective, an apparatus for tuning a golden filter may comprise: a processor; and a memory configured to store one or more commands to be executed by the processor, wherein the one or more commands comprise: a command for fixing the golden filter with a plurality of filter fixing bolts and nuts; a command for bringing a plurality of height adjusting screws into contact with tuning screws of the fixed golden filter; a command for fixing the plurality of height adjusting screws with height adjusting screw nuts; and a command for removing the plurality of filter fixing bolts and nuts and moving the golden filter.

The command for bringing the plurality of height adjusting screws into contact with the tuning screws of the fixed golden filter may comprise a command for rotating the plurality of height adjusting screws clockwise or counterclockwise with torque preset by a user.

The height adjusting screw may be provided in the form of a self-locking screw.

A driver slot may be formed in an edge portion of the height adjusting screw, and a hole may be formed at a center of the height adjusting screw.

The number of height adjusting screws may be at least equal to the number of tuning screws of the golden filter.

The one or more commands further comprise: a command for fixing the golden filter with a flat spring or a coil spring instead of the filter fixing bolt and nut.

According to the embodiment of the present disclosure, it is possible to accurately adjust the heights of the tuning screws of the golden filter.

In addition, according to another embodiment of the present disclosure, it is possible to accurately tune a novel microwave filter using the golden filter.

DETAILED DESCRIPTION OF THE EMBODIMENTS

Figure 1:
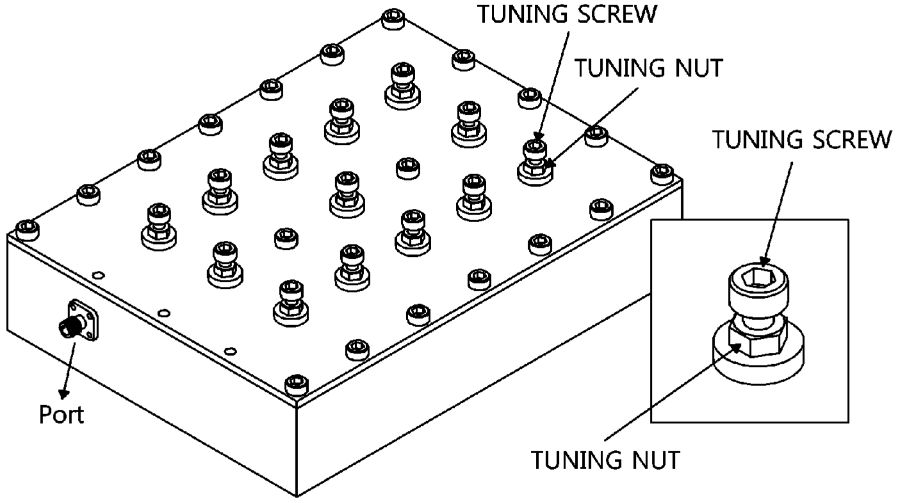
FIG. 1 is a view for explaining a typical microwave filter tuning apparatus.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings.

FIG. 1 is a view for explaining a typical microwave filter tuning apparatus.

Referring to FIG. 1, the typical microwave filter tuning apparatus includes a plurality of tuning screws and a plurality of tuning nuts. In this case, the tuning nut is used to fix the tuning screw.

Figure 2:
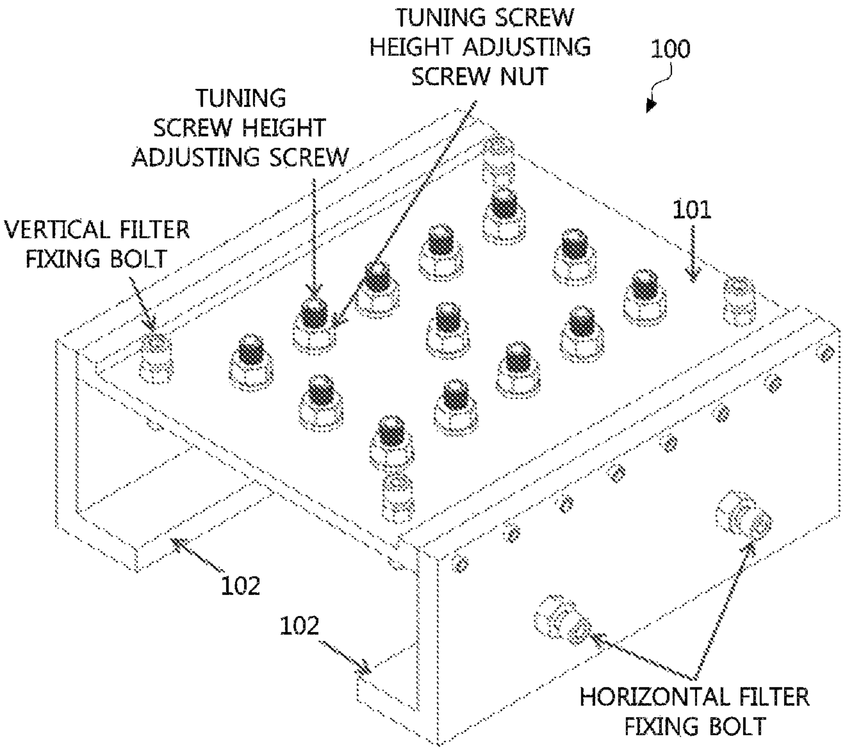
FIG. 2 is a conceptual view of a golden filter tuning apparatus according to the present disclosure.
Figure 3:
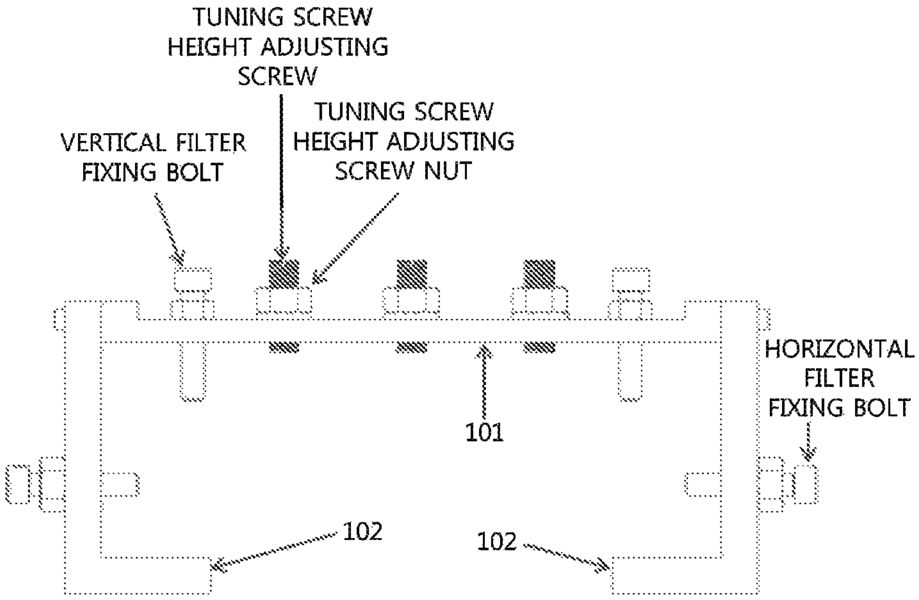
FIG. 3 is a side view of the golden filter tuning apparatus according to the present disclosure.

FIG. 2 is a conceptual view of a golden filter tuning apparatus according to the present disclosure, and FIG. 3 is a side view of the golden filter tuning apparatus according to the present disclosure.

Referring to FIGS. 2 and 3, a golden filter tuning apparatus 100 according to the present disclosure may include a tuning plate 101 and tuning plate support brackets 102.

Specifically, the tuning plate 101 may include a plurality of tuning screw height adjusting screw and a plurality of tuning screw height adjusting screw nuts. In addition, the tuning plate 101 may include vertical filter fixing bolts and nuts for fixing a golden filter. That is, the tuning plate 101 may measure the heights of the tuning screws of the golden filter and provide a reference height of the tuning screw of the microwave filter to be tuned using the golden filter. In this case, the number of tuning screw height adjusting screws of the tuning plate 101 may be at least equal to the number of tuning screws of the golden filter or the number of tuning screws of the microwave filter to be tuned.

In addition, the vertical filter fixing bolts and nuts of the tuning plate 101 may fix the golden filter or the microwave filter to be tuned.

Meanwhile, the tuning plate support brackets 102 may be coupled to the tuning plate and used to fix the tuning plate while maintaining a preset distance between the tuning plate and the microwave filter to be tuned. That is, the tuning plate support brackets 102 may fix the golden filter or the microwave filter to be tuned using horizontal filter fixing bolts and nuts included in the tuning plate support bracket.

In addition, the tuning plate 101 and the tuning plate support brackets 102 may be assembled and coupled or integrated with one another. However, the assembled shapes of the tuning plate 101 and the tuning plate support brackets 102 are not limited thereto.

Figure 4:
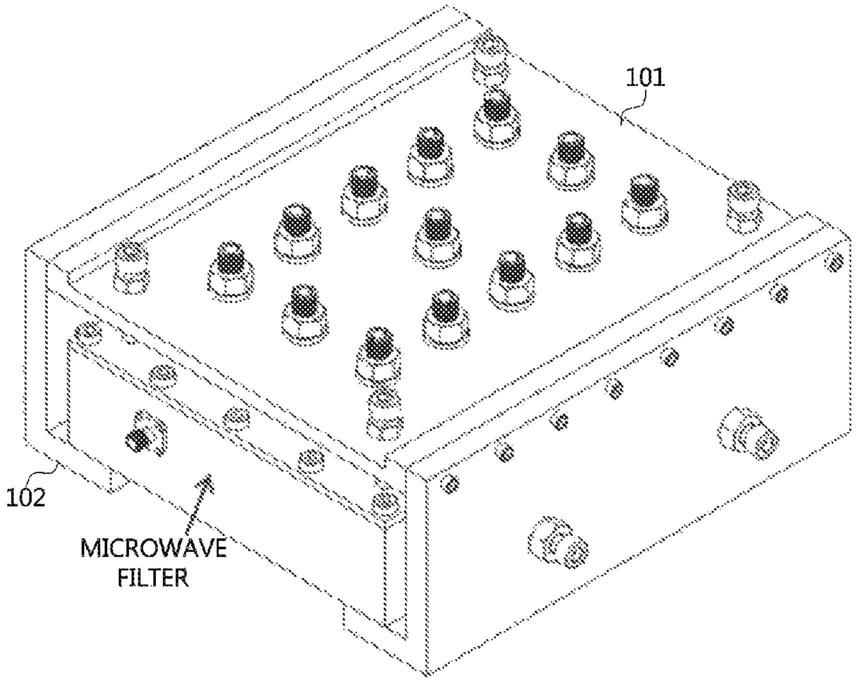
FIG. 4 is an exemplified view illustrating a state in which the golden filter tuning apparatus according to the present disclosure is used.
Figure 5:
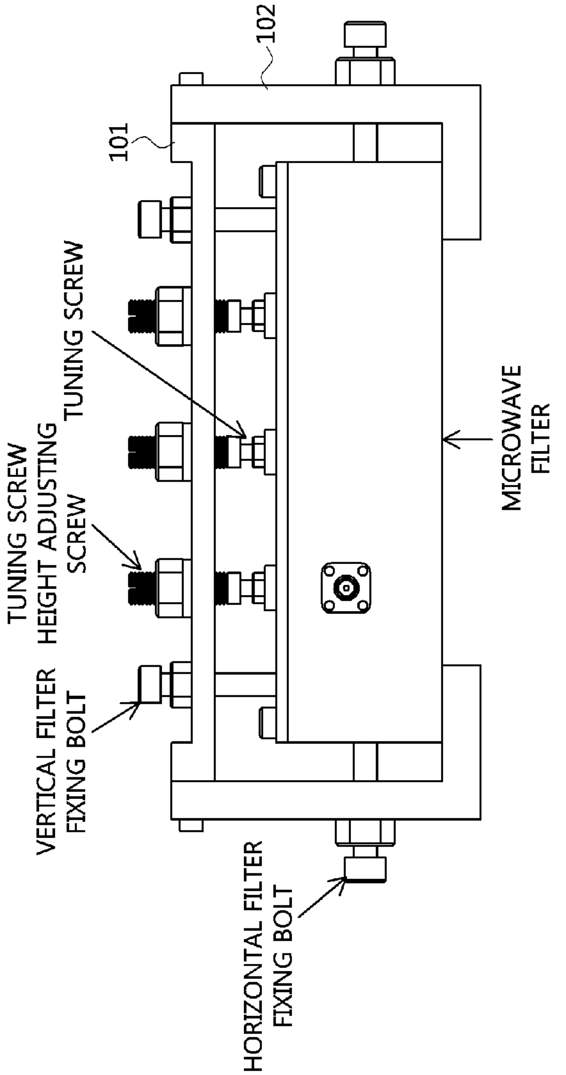
FIG. 5 is a side view of FIG. 4.
Figure 6:
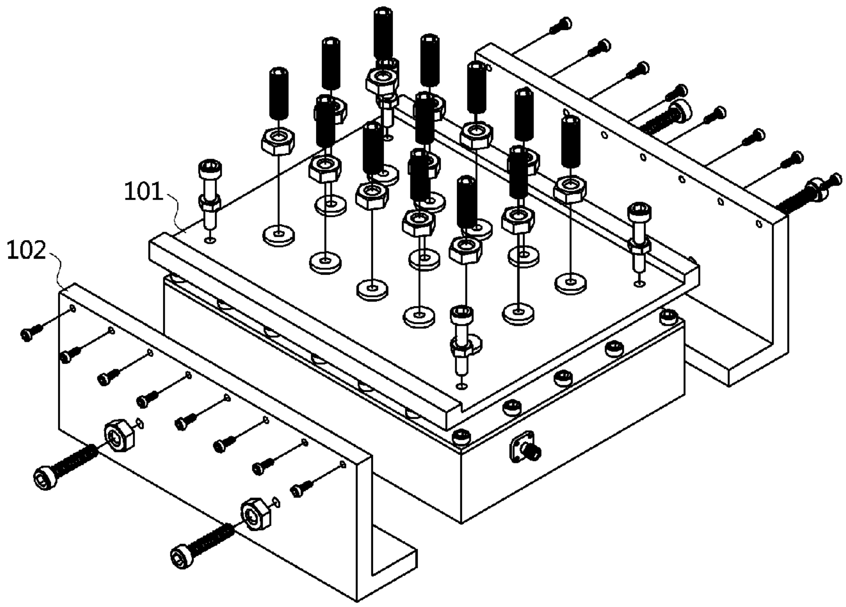
FIG. 6 is an exploded view of FIG. 4.
Figure 7:
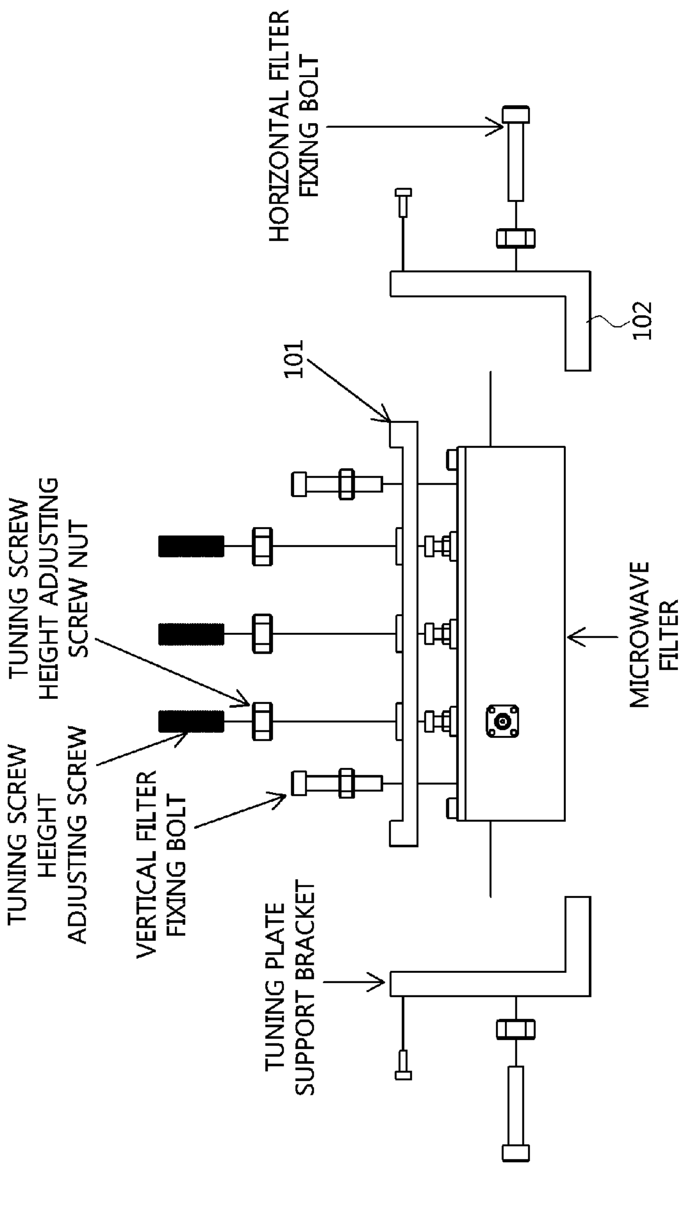
FIG. 7 is an exploded view of FIG. 5.

FIG. 4 is an exemplified view illustrating a state in which the golden filter tuning apparatus according to the present disclosure is used, FIG. 5 is a side view of FIG. 4, FIG. 6 is an exploded view of FIG. 4, and FIG. 7 is an exploded view of FIG. 5.

Referring to FIGS. 4 to 7, the golden filter tuning apparatus according to the present disclosure may fix the golden filter, which is used to initially tune the microwave filter, and tune the golden filter. In this case, the golden filter may be fixed by the vertical filter fixing bolts and the horizontal filter fixing bolts of the golden filter tuning apparatus.

Meanwhile, the golden filter tuning apparatus may bring the height adjusting screws into contact with the tuning screws of the golden filter by adjusting the height adjusting screws. In this case, the plurality of height adjusting screws may be adjusted by being rotated clockwise or counterclockwise depending on torque preset by a user.

When the height adjusting screws of the golden filter tuning apparatus come into contact with the tuning screws of the golden filter, the golden filter tuning apparatus may fix the height adjusting screws with the height adjusting screw nuts and store the heights of the tuning screws of the golden filter.

Meanwhile, a new microwave filter may be initially tuned by being inserted into the golden filter tuning apparatus that stores the heights of the tuning screws of the golden filter.

For example, the golden filter tuning apparatus may adjust the tuning screws of the new microwave filter so that the heights of the tuning screws of the new microwave filter are equal to the heights of the tuning screws of the golden filter.

Figure 8A:
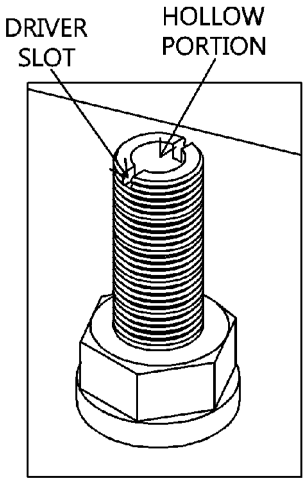
FIGS. 8A and 8B are views for explaining the tuning screws used for the golden filter tuning apparatus according to the present disclosure.
Figure 8B:
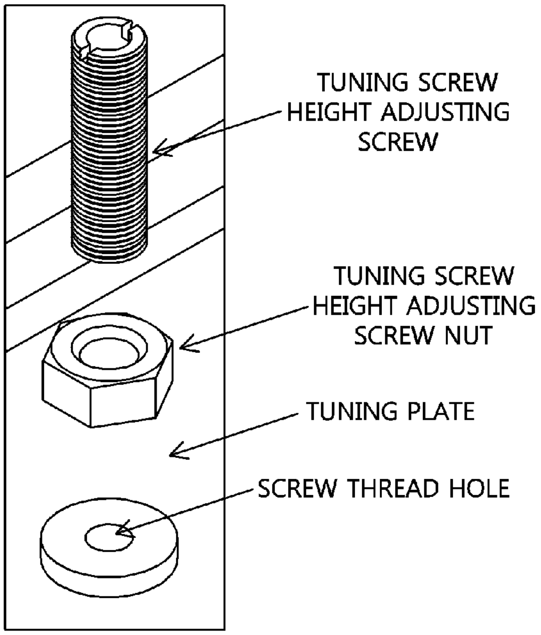

FIGS. 8A and 8B are views for explaining the tuning screws used for the golden filter tuning apparatus according to the present disclosure.

Referring to FIGS. 8A and 8B, the tuning screw used for the golden filter tuning apparatus according to the present disclosure may be the height adjusting screw capable of adjusting the height. In this case, a driver slot may be formed at one end of the height adjusting screw, and the height adjusting screw may be adjusted by a screwdriver. However, the present disclosure is not limited to the configuration in which the height adjusting screw is adjusted only by the screwdriver. The height adjusting screw may be adjusted by a machine or automation means instead of the screwdriver.

In addition, a hole may be formed at a center of the height adjusting screw. Therefore, the tuning screw of the golden filter or the microwave filter may be adjusted by means of the hole of the height adjusting screw of the golden filter tuning apparatus even after the golden filter or the microwave filter is fixed to the golden filter tuning apparatus.

Figure 9:
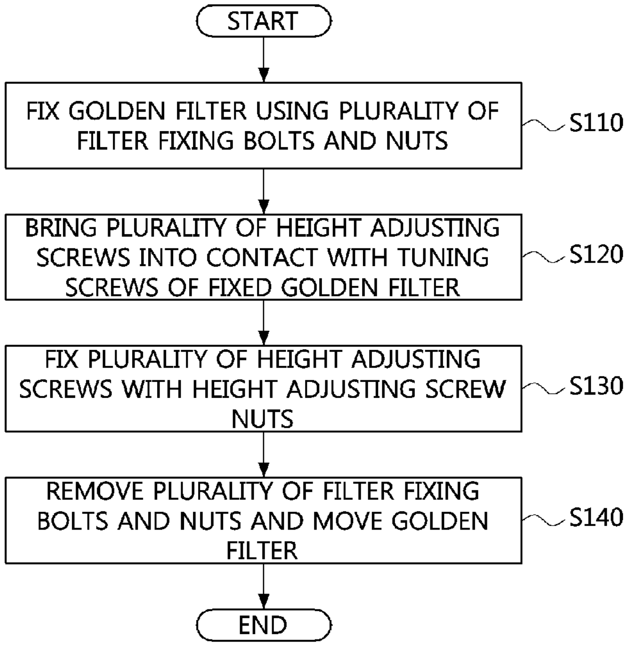
FIG. 9 is an operational flowchart illustrating a golden filter tuning method according to the embodiment of the present disclosure.

FIG. 9 is an operational flowchart illustrating a golden filter tuning method according to the embodiment of the present disclosure.

Referring to FIG. 9, the golden filter tuning method according to the embodiment of the present disclosure is a method of tuning the golden filter used to initially tune the microwave filter using the golden filter tuning apparatus. The golden filter tuning method may include step S110 of fixing the golden filter using the plurality of filter fixing bolts and nuts.

In this case, before fixing the golden filter, the golden filter tuning apparatus adjusts the height adjusting screws of the golden filter tuning apparatus to maximally upper positions so that the golden filter may be inserted into the golden filter tuning apparatus without interruption.

In addition, the golden filter tuning apparatus may adjust the height adjusting screws so that the height adjusting screws of the golden filter tuning apparatus and the tuning screws of the golden filter are positioned on a straight line.

In addition, the golden filter tuning method may include step S120 of bringing the plurality of height adjusting screws into contact with the tuning screws of the fixed golden filter.

In this case, the step of bringing the plurality of height adjusting screws into contact with the tuning screws of the fixed golden filter may include a step of rotating the plurality of height adjusting screws clockwise or counterclockwise with torque preset by the user.

In addition, the height adjusting screw may be provided in the form of a self-locking screw. In this case, the self-locking screw may mean a screw capable of fixing the height adjusting screw without the height adjusting screw nut.

Meanwhile, a driver slot may be formed in an edge portion of the height adjusting screw, and the hole may be formed at the center of the height adjusting screw.

In addition, the number of height adjusting screws may be at least equal to the number of tuning screws of the golden filter.

Meanwhile, the golden filter tuning method may include step S130 of fixing the plurality of height adjusting screws with the height adjusting screw nuts.

In addition, the golden filter tuning method may include step S140 of removing the plurality of filter fixing bolts and nuts and moving the golden filter.

Meanwhile, the golden filter tuning method may include a step of fixing the golden filter with a flat spring or a coil spring instead of the filter fixing bolt and nut.

While the golden filter tuning method according to the present disclosure has been described with reference to the configuration in which the tuning screws of the microwave filter or the golden filter are disposed in an upward/downward direction. However, the golden filter tuning method according to the present disclosure may be applied to a configuration in which the tuning screws of the microwave filter or the golden filter are disposed in a leftward/rightward direction.

Meanwhile, the effect of the golden filter tuning method according to the present disclosure may be maximized when the tuning screws of the golden filter or the microwave filter and the height adjusting screws of the golden filter tuning apparatus are equal in size, shape, and length to one another. However, the present disclosure is not limited thereto, and the effect may be maximized when the tuning screws and the height adjusting screws, which are tuned at the same position, are equal in size, shape, and length to one another.

Meanwhile, according to the embodiment of the present disclosure, it is possible to tune a new microwave filter using the golden filter tuned by the golden filter tuning apparatus according to the present disclosure. For example, the height adjusting screws of the golden filter tuning apparatus, which are tuned by the golden filter, may be adjusted depending on the heights of the tuning screws of the golden filter. Further, a new microwave filter may be tuned by adjusting and bringing the tuning screws of the new microwave filter into contact with the height adjusting screws of the golden filter tuning apparatus.

Specifically, to tune the microwave filter to be tuned, the tuning screws of the microwave filter are adjusted to maximally lower positions first so that the microwave filter may be inserted into the golden filter tuning apparatus without interruption. Next, the microwave filter may be fixed with the filter fixing bolts and nuts of the golden filter tuning apparatus. Next, the heights of the tuning screws of the microwave filter may be adjusted by means of the holes formed in the height adjusting screws of the golden filter tuning apparatus, such that the tuning screws of the microwave filter may come into contact with the height adjusting screws of the golden filter tuning apparatus. Lastly, it is possible to tune the microwave filter by removing the filter fixing bolts and nuts of the golden filter tuning apparatus.

Figure 10:
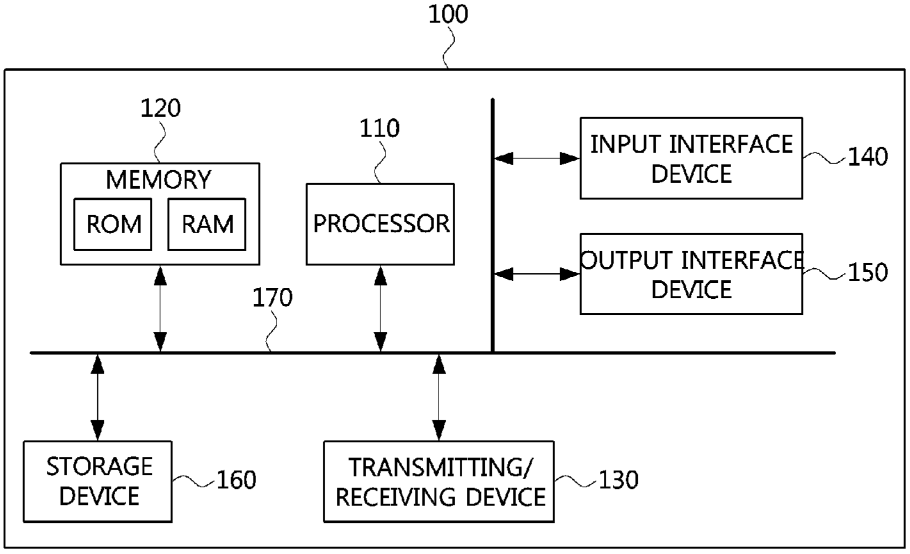
FIG. 10 is a block configuration view of the golden filter tuning apparatus according to another embodiment of the present disclosure.

FIG. 10 is a block configuration view of the golden filter tuning apparatus according to another embodiment of the present disclosure.

Referring to FIG. 10, the golden filter tuning apparatus 100 according to the embodiment of the present disclosure may include a processor 110, a memory 120 configured to store one or more commands to be executed by the processor and results of executing the commands, and a transmitting/receiving device 130 connected to a network and configured to perform communication.

In addition, the golden filter tuning apparatus 100 may further include an input interface device 140, an output interface device 150, and a storage device 160. The respective constituent elements included in the golden filter tuning apparatus 100 may be connected by means of a bus 170 and communicate with one another.

The processor 110 may execute program commands stored in at least one of the memory 120 and the storage device 160. The processor 110 may mean a central processing unit (CPU), a graphic processing unit (GPU), or an exclusive processor for executing the methods according to the embodiment of the present disclosure. The memory 120 and the storage device 160 may each be configured as at least one of a volatile storage medium and a non-volatile storage medium. For example, the memory 120 may be configured as at least one of read-only memory (ROM) and random-access memory (RAM).

The storage device 160 may store heights of the tuning screws of the golden filter, heights of the height adjusting screws of the golden filter tuning apparatus, and magnitudes of torque for rotating the height adjusting screws of the golden filter tuning apparatus.

In this case, the one or more commands may include: a command for fixing the golden filter with a plurality of filter fixing bolts and nuts; a command for bringing a plurality of height adjusting screws into contact with tuning screws of the fixed golden filter; a command for fixing the plurality of height adjusting screws with height adjusting screw nuts; and a command for removing the plurality of filter fixing bolts and nuts and moving the golden filter.

The command for bringing the plurality of height adjusting screws into contact with the tuning screws of the fixed golden filter may include a command for rotating the plurality of height adjusting screws clockwise or counterclockwise with torque preset by a user.

In addition, one or more commands may include a command for fixing the golden filter with a flat spring or a coil spring instead of the filter fixing bolt and nut.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

Although the present disclosure has been described with reference to preferred embodiments, it will be apparent to those skilled in the art that the present disclosure may be variously changed and modified without departing from the spirit and scope of the invention defined in the following claims.

What is claimed is:

1. A method of tuning a golden filter used to initially tune a microwave filter using an apparatus for tuning the golden filter, the method comprising:

fixing the golden filter with a plurality of filter fixing bolts and nuts;

bringing a plurality of height adjusting screws into contact with tuning screws of the fixed golden filter; and fixing the plurality of height adjusting screws with height adjusting screw nuts; and wherein the plurality of height adjusting screws are provided in the form of a self-locking screw, and wherein the golden filter are moved after the plurality of filter fixing bolts and nuts are removed.

2. The method of claim 1, wherein the bringing of the plurality of height adjusting screws into contact with the tuning screws of the fixed golden filter comprises rotating the plurality of height adjusting screws clockwise or counterclockwise with a preset torque.

3. The method of claim 1, wherein a driver slot is formed in an edge portion of each of the height adjusting screws, and a hole is formed at a center of each of the height adjusting screws.

4. The method of claim 1, wherein the number of the height adjusting screws is at least equal to the number of the tuning screws of the golden filter.

5. The method of claim 1, comprising:

fixing the golden filter with a flat spring or a coil spring instead of the filter fixing bolt and nut.

6. An apparatus for tuning a golden filter, the apparatus comprising:

a processor; and a memory configured to store one or more commands to be executed by the processor, wherein the one or more commands comprise:

a command for fixing the golden filter with a plurality of filter fixing bolts and nuts;

a command for bringing a plurality of height adjusting screws into contact with tuning screws of the fixed golden filter; and a command for fixing the plurality of height adjusting screws with height adjusting screw nuts, wherein the golden filter is moved after the plurality of filter fixing bolts and nuts are removed;

wherein a driver slot is formed in an edge portion of each of the plurality of the height adjusting screws, and a hole is formed at a center of each of the plurality of the height adjusting screws.

7. The apparatus of claim 6, wherein the command for bringing the plurality of height adjusting screws into contact with the tuning screws of the fixed golden filter comprises a command for rotating the plurality of height adjusting screws clockwise or counterclockwise with a preset torque.

8. The apparatus of claim 6, wherein each of the height adjusting screws is provided in the form of a self-locking screw.

9. The apparatus of claim 6, wherein the number of the height adjusting screws is at least equal to the number of the tuning screws of the golden filter.

10. The apparatus of claim 6, comprising:

a command for fixing the golden filter with a flat spring or a coil spring instead of the filter fixing bolt and nut.

11. An apparatus for tuning a golden filter used to initially tune a microwave filter, the apparatus comprising:

a flat spring or a coil spring for being configured to fix the golden filter;

a plurality of height adjusting screws for being configured to contact with tuning screws of the fixed golden filter; and height adjusting screw nuts for being configured to fix the plurality of height adjusting screws;

wherein the golden filter are moved after the plurality of filter fixing bolts and nuts are removed.

12. The apparatus of claim 11, wherein positions of the plurality of height adjusting screws are adjusted by rotating the plurality of height adjusting screws clockwise or counterclockwise.

13. The apparatus of claim 11, wherein each of the height adjusting screws is provided in the form of a self-locking screw.

14. The apparatus of claim 11, wherein a driver slot is formed in an edge portion of each of the height adjusting screws.

15. The apparatus of claim 11, wherein a driver slot is formed in an edge portion of each of the height adjusting screws, and a hole is formed at a center of each of the height adjusting screws.

16. The apparatus of claim 11, wherein the number of the height adjusting screws is at least equal to the number of the tuning screws of the golden filter.

* * * * *